(12) United States Patent
Eichhorn et al.

(10) Patent No.: US 7,316,494 B2
(45) Date of Patent: Jan. 8, 2008

(54) LIGHTING UNIT FOR MOTOR VEHICLES

(75) Inventors: Karsten Eichhorn, Wadersloh (DE); Susanne Hagedorn, Lippstadt (DE)

(73) Assignee: Hella KG Hueck & Co., Lippstadt (DE)

( * ) Notice: Subject to any disclaimer, the term of this patent is extended or adjusted under 35 U.S.C. 154(b) by 86 days.

(21) Appl. No.: 10/551,490

(22) PCT Filed: Apr. 3, 2004

(86) PCT No.: PCT/EP2004/003566

§ 371 (c)(1),
(2), (4) Date: Sep. 29, 2005

(87) PCT Pub. No.: WO2004/088202

PCT Pub. Date: Oct. 14, 2004

(65) Prior Publication Data

US 2006/0198118 A1    Sep. 7, 2006

(30) Foreign Application Priority Data

Apr. 3, 2003    (DE) ................................ 103 15 133

(51) Int. Cl.
*B60Q 1/04* (2006.01)
*F21S 8/10* (2006.01)
(52) U.S. Cl. ...................... 362/545; 362/236; 362/248
(58) Field of Classification Search .................. 362/84, 362/235–237, 240, 241, 244–248, 260, 268, 362/278, 506, 507, 509, 510, 540, 543–545, 362/612
See application file for complete search history.

(56) References Cited

U.S. PATENT DOCUMENTS

| | | | | |
|---|---|---|---|---|
| 4,630,180 A | * | 12/1986 | Muraki et al. | 362/223 |
| 5,382,811 A | * | 1/1995 | Takahashi | 257/88 |
| 5,779,351 A | * | 7/1998 | Erickson et al. | 362/241 |
| 5,836,676 A | * | 11/1998 | Ando et al. | 362/244 |
| 6,208,078 B1 | * | 3/2001 | Fujii et al. | 313/510 |
| 6,520,669 B1 | * | 2/2003 | Chen et al. | 362/545 |
| 6,619,825 B2 | * | 9/2003 | Natsume | 362/509 |
| 2003/0165061 A1 | * | 9/2003 | Martineau | 362/297 |
| 2004/0000867 A1 | * | 1/2004 | Chen | 313/512 |

* cited by examiner

*Primary Examiner*—Alan Cariaso
*Assistant Examiner*—Leah S. Lovell
(74) *Attorney, Agent, or Firm*—Husch & Eppenberger LLC; Robert C. Haldiman

(57) ABSTRACT

A lighting unit for vehicles has a plurality of semiconductor light sources distributed in a grid. The grid of semiconductor light sources is divided into at least two grid segments, the grid segments being each activatable independently of each other and/or assigned to a different light functions, with an optical element in the beam path of a light beam emitted by the semiconductor light sources. The semiconductor light sources (3) are arranged on a common carrier substrate (5), with a chip cover (6) transparent to light in the direction of light propagation, in that the chip cover (6) is filled with a light-scattering and/or light-converting auxiliary material (8) and in that a shading device (9) is provided such that, in the boundary region between the activated grid segment (10) and the unactivated grid segment (11), a relatively steep transition of light intensity is adjustable to form a light/dark boundary.

20 Claims, 2 Drawing Sheets

LIGHTING UNIT FOR MOTOR VEHICLES

CROSS-REFERENCE TO RELATED APPLICATIONS

This application is a National Stage application of International Application No. WO 2004/088202 PCT/EP2004/003566 filed on Apr. 3, 2004 and claims priority to German Application No. 103 15 133.8 filed on Apr. 3, 2003.

BACKGROUND OF THE INVENTION

1. Field of the Invention

The invention concerns a lighting unit for vehicles with a plurality of semiconductor light sources distributed in a grid, the grid of semiconductor light sources being divided into at least two grid segments, the grid segments being each activatable independently of each other and/or assigned to a different light function, with an optical element in the beam path of a light beam emitted by the semiconductor light sources 2. Related Art From DE 100 09 782 A1 is known a lighting unit for motor vehicles, which has as a light source a plurality of semiconductor light sources arranged in a grid. The grid of semiconductor light sources is divided into grid segments, wherein each differently activatable grid segment can be assigned a different light function. The light beam emitted by the grid segments is projected according to a predetermined light distribution by means of a lens mounted in front in the direction of light propagation. Between the grid of semiconductor light sources and the lens is arranged a stop, so that the known lighting unit works on the basis of the projection principle.

A disadvantage of the known lighting unit is that the grids or grid segments have a relatively large two-dimensional extent, as each semiconductor light source has its own housing. Furthermore, it is always necessary for a stop to be arranged between the grid of semiconductor light sources and the lens.

SUMMARY OF THE INVENTION

It is the object of the present invention to develop a lighting unit for motor vehicles in such a way that the lighting unit has a more compact and space-saving construction.

To achieve this object, the invention is a lighing unit for vehicles with a plurality of semiconductor light sources distributed in a grid, the grid of semiconductor light sources being divided into at least two grid segments, the grid segments being each activatable independently of each other and/or assigned to a different light function, with an optical element in the beam path of a light beam emitted by the semiconductor light sources where the semiconductor light sources arranged on a common carrier substrate, with a chip cover transparent to light in the direction of light propagation, in that the chip cover is filled with a light-scattering and/or light-converting auxiliary material and in that a shading device is provided such that, in the boundary region between the activated grid segment and the un activated grid segment, a relatively steep transition of light intensity is adjustable to form a light/dark boundary.

The particular advantage of the invention lies in that, due to the concentrated arrangement of the semiconductor light sources on a common carrier substrate and the associated high packing density of semiconductor light sources, the luminance of the light source can be substantially increased. For ease of manufacture, the individual semiconductor light sources can be arranged as chips on a common carrier substrate. A common chip cover which is transparent to light and a light-scattering and/or light-converting auxiliary medium integrated therein cause a homogeneously illuminating light exit surface. A spatially concentrated light source with a relatively high luminance is advantageous according to the invention. A shading device causes a relatively steep transition of light intensity in the boundary region between a first grid segment activated by a control unit and a second grid segment not activated by the control unit. As a result, a relatively sharp light/dark boundary can be achieved. The grid segments can, for example, be activated to form a dipped beam and a main beam.

According to a development of the invention, the shading device is designed as a partition arranged between the first grid segment and the second grid segment, the free end of the partition being spaced apart from a front side of the chip cover in such a way that there is a minor light interaction between the adjacent grid segments. The light functions of the individual grid segments are only slightly disturbed by scattered light of the adjacent grid segment. The design of the shading device as a partition allows unique fixing of mutual light control of adjacent grid segments already during manufacture of the light source.

Advantageously, the partition projects from the carrier substrate in such a way that, in case of simultaneous activation of adjacent grid segments, the formation of a black line on a measuring screen is prevented.

According to a development of the invention, the semiconductor sources are respectively designed as chips, the chips being arranged on a common carrier substrate. As a result, a plurality of semiconductor sources can be formed to save space and miniaturise.

According to a development of the invention, optical elements are arranged by adhesion on the front side of the chip cover and adapted to the corresponding chips. As a result, selective light conduction directly at the light exit surface of the light source is made possible.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Two practical examples of the invention are described in more detail below with the aid of the drawings. They show.

DETAILED DESCRIPTION OF THE PREFERRED EMBODIMENTS

Figure 1:
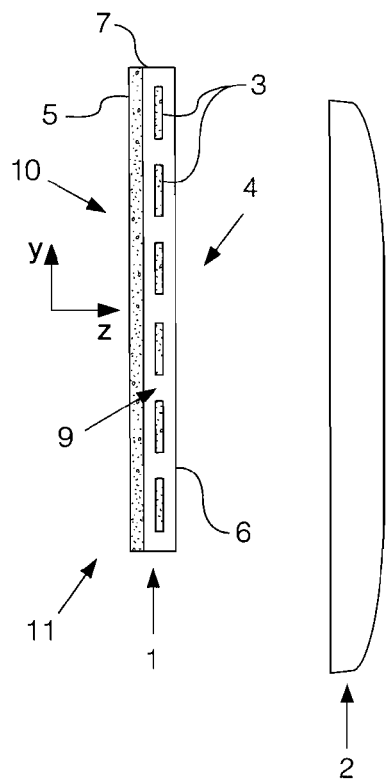
FIG. 1: a schematic cross-section through a lighting unit.

The following description of the preferred embodiment(s) is merely exemplary in nature and is in no way intended to limit the invention, its application, or uses.

A lighting unit for vehicles, in particular motor vehicles, essentially consists of a light source 1 and an optical element 2 which projects the light beam emitted from the light source 1 directly according to a predetermined light distribution.

The lighting unit according to the invention can serve, for example, as a headlamp for the generation of a dipped beam, main beam, motorway beam and/or cornering beam function.

The light source 1 is formed from a plurality of semiconductor light sources 3, in particular LED light sources (light-emitting diodes), which are arranged after the fashion of a grid 4 on a common carrier substrate 5.

Figure 2:
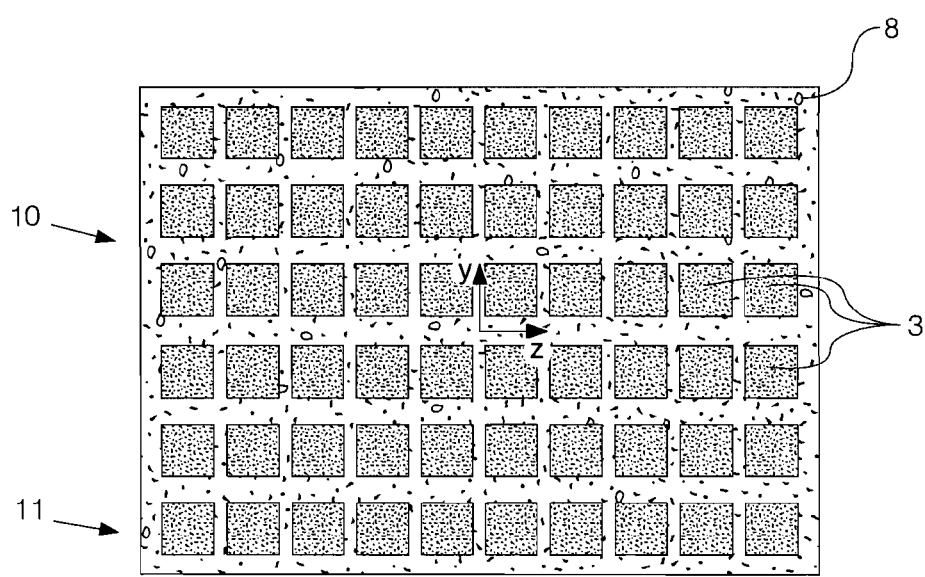
FIG. 2: a top view of a grid of semiconductor light sources.

As can be seen from FIG. 2, the semiconductor light sources 3 are arranged regularly adjacent to and under each other. The semiconductor light sources 3 are designed as so-called chips which are mounted on a common carrier substrate 5.

As FIG. 1 shows, the chips 3 are provided with a common transparent chip cover 6 on one side facing away from the carrier substrate 5. The chip cover 6 and the carrier substrate 5 form a housing 7 which completely surrounds the semiconductor light sources 3. The chip cover 6 is designed as a planar cast body which is mounted after fitting the carrier substrate 5 with the chip 3.

The cast body 6 has a light-scattering and/or light-converting auxiliary material 8, in particular a luminescent material. The auxiliary material 8 causes white light to be emitted from a front side 15 of the chip cover 6 in the direction of light propagation. The auxiliary material 8 is evenly distributed in the cast body 6.

Figure 3:
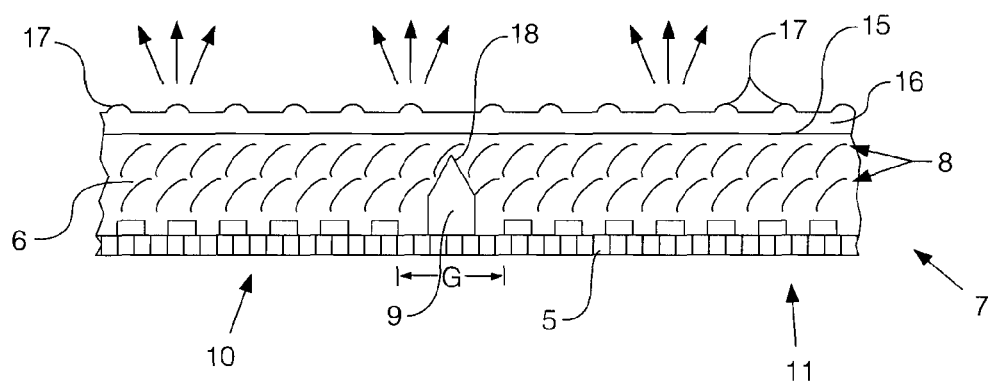
FIG. 3: an enlarged cross-section through a lighting unit according to a second embodiment.

In the embodiment according to FIG. 3, an optical element 16 is designed as a primary optical element (lens) abutting directly on the front side 15 of the cast body 6 by adhesion. The primary optical element has a plurality of lens elements 17 which are respectively oriented in relation to the chip 3. The primary optical element 16 is manufactured in one piece from a plastic material and joined to the cast body 6 by adhesion on the front side 15 thereof.

The grid 4 of semiconductor light sources 3 is divided by means of a shading device 9 into an upper grid segment 10 and a lower grid segment 11. The upper grid segment 10 serves to produce a dipped beam function. The lower grid segment 11 serves to produce a main beam function. It is connected to the upper grid segment 10 to produce the main beam by means of a control unit, not shown, so that all semiconductor light sources 3 of the grid 4 are in use.

The shading device 9 is designed as a partition which extends perpendicularly to the extent of the carrier substrate 5 between the latter and the housing cover 6. The partition 9 causes perfect light separation of the two grid segments 10 and 11. The partition causes in particular, in case of activation of only one grid segment 10 or 11, no edge stripe or a reduced edge stripe to light up as well along the partition 9 of the other grid segment 11 or 10. Such lighting up could be caused by the auxiliary material 8 which is located in the adjacent grid segment 10 or 11. Advantageously, a sharp light/dark boundary can be formed as a result.

A free end of the partition 9 is designed to taper as an apex 18 and arranged at a distance from the front side 15 of the cast body 6. This ensures that, with simultaneous activation of the first and second grid segments 10 and 11, no disturbing dark stripe is projected by the boundary region thereof. Thus a homogeneous light transition is obtained in the boundary region between the grid segments 10 and 11 to form the main beam. Furthermore, alternatively a second grid segment can add a cornering beam or a motorway beam homogeneously to the dipped beam.

The carrier substrate 5 forms, together with the semiconductor light sources 3 arranged in a grid, a semiconductor light source array. As a result, a concentrated and space-saving light source can be produced, which if necessary has grid segments activated differently in a simple manner. Advantageously, miniaturisation of a light source can be produced by this means, which in a manner allowing ease of manufacture improves variability in the use of light functions. Firstly, the array can have a predetermined shape which is dependent on the required luminosity, light function or the shape of the opening in the vehicle body. This can be effected by suitably trimming the chip wafer.

Secondly, the chips 3 themselves can also have a shape adapted to the requirements. For instance, the chips 3 can be of triangular or honeycomb-like structure, so that the break in the 15° light/dark boundary can be simulated better or the packing density is greater.

Due to the extent of the shading device 9, a predetermined light/dark boundary can be produced. Individual groups of semiconductor light sources 3 can be combined to form basic light, asymmetrical light or other light fractions.

Advantageously, the carrier substrate 5 can also contain the activation circuit for the semiconductor light sources 3. The control unit can be designed as an integrated circuit, for example.

The carrier substrate 5 can be made of an electrically conductive material, in particular copper, or a non-conductive material, in particular ceramic material or a plastic material. The carrier substrate 5 serves as a carrier for the light components or passive or active components and for current conduction. The chips 3 are connected by the bond technique to corresponding terminals of the carrier substrate 5 and completely covered by the cast surface 6.

For this purpose, electrically conductive strip conductors are arranged on the carrier substrate 5.

The light source 1 according to the embodiment in FIG. 1 is arranged in a focal plane of the lens 2 (secondary optical element), so that the light beam emitted by the light source 1, 3 is projected according to a predetermined light distribution exclusively by the shape of the lens 2.

Figure 4:
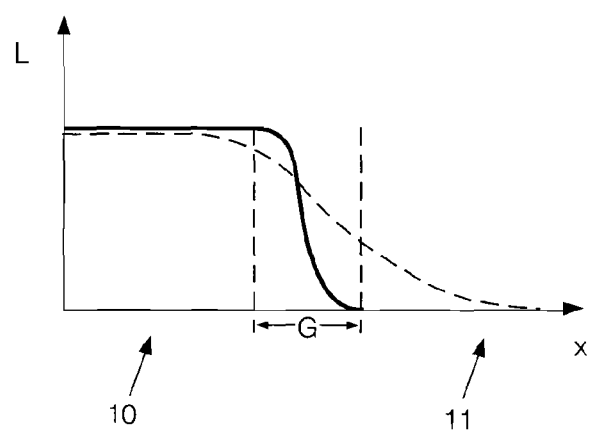
FIG. 4: an illuminance distribution of the lighting unit projected onto a measuring screen, in a boundary region between an activated first grid segment and an un activated second grid segment.

In FIG. 4 is shown the illuminance distribution L over the distance x which appears on a measuring screen when only the first grid segment 10 is activated to form a dipped beam function. The illuminance distribution is shown according to the unbroken line, a high gradient of illuminance distribution being produced in a boundary region G between the first grid segment 10 and the second grid segment 11. This is obtained by the shading device 9 which is arranged in this boundary region G. As a result, a sharp light/dark boundary can be obtained.

Compared with this, the illuminance distribution is shown without the presence of a shading device 9 in the boundary region G (broken line). Due to the continuous and steady transition of this illuminance distribution from the first grid segment 10 to the second grid segment 11, a sharp light/dark boundary can be obtained.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. Lighting unit for vehicles comprising:
a plurality of semiconductor light sources (3) distributed in a grid, the grid of semiconductor light sources being divided into at least two grid segments, the grid segments being each activatable independently of each other;
an optical element (2) in the beam path of a light beam emitted by the semiconductor light sources,
the semiconductor light sources (3) being arranged on a common carrier substrate (5), with a chip cover (6) transparent to light in the direction of light propagation,
the chip cover (6) is filled with a light-scattering or light-converting auxiliary material (8); and
a shading device (9), in the boundary region between one of said grid segment (10) and another of said grid segment (11), such said shading device increases a gradient of light intensity at a light/dark boundary.

2. Lighting unit according to claim 1, wherein the shading device (9) is arranged in the boundary region between an activated grid segment (10) and an unactivated grid segment (11).

3. Lighting unit according to claim 1 wherein the shading device (9) is designed as a partition which separates the two grid segments (10, 11) from each other and which projects from the carrier substrate (5) in the direction of light propagation.

4. Lighting unit according to claim 3, wherein the shading device extends perpendicularly to the carrier substrate (5) and in that the free end of the shading device is arranged at a distance from and/or tapering towards a front side (15) of the chip cover (6).

5. Lighting unit according to any of claim 1 wherein the semiconductor light sources (3) of the at least two grid segments (10, 11) are designed as a plurality of chips emitting UV radiation and/or emitting blue light, and arranged in the form of a semiconductor light source array.

6. Lighting unit according to claim 5, wherein the semiconductor light source (3) array is arranged in a focal plane of the optical element (2, 16).

7. Lighting unit according to any of claim 1 wherein the shading device has a longitudinal extent in the direction of the path of the carrier substrate (5) corresponding to the formation of the light/dark boundary.

8. Lighting unit according to any of claim 1 wherein the auxiliary material (8) is formed as a light converter, in particular by a luminescent material.

9. Lighting unit according to any of claim 1 wherein the carrier substrate (5) is of flat or curved construction.

10. Lighting unit according to any of claim 1 wherein on a front side (15) of the chip cover (6) facing away from the carrier substrate (5) is arranged an optical element (16) resting directly on the chip cover (6).

11. The lighting unit of claim 1 wherein said common carrier substrate is substantially on a single plane.

12. The lighting unit of claim 1 wherein said steeper transition of light intensity is formed in a light/dark boundary between said first grid segment and said second grid segment.

13. The lighting unit of claim 1 wherein said shading device is completely surrounded by said chip cover and contiguous with said chip cover.

14. The lighting unit of claim 1 wherein said chip cover is a planar cast body adjoining said common carrier substrate.

15. The lighting unit of claim 1 wherein said shading device is fixedly attached to said common carrier substrate.

16. The lighting unit of claim 1 wherein said shading device is between said common carrier substrate and any optical element relative to a direction of light propagation.

17. The lighting unit of claim 1 wherein said optical element abuts said chip cover, said chip cover abuts said light sources and said common carrier substrates.

18. The lighting unit of claim 1 wherein said common carrier substrate is a single substrate.

19. The lighting unit of claim 1 wherein said shading device reduces an edge stripe when only one of said grid segments is illuminated.

20. The lighting unit of claim 1 wherein said shading device increases light separation between said two grid segments.

* * * * *